United States Patent [19]

Bauer

[11] Patent Number: 5,152,646

[45] Date of Patent: Oct. 6, 1992

[54] METHOD FOR THE PRODUCTION OF AN INTERNAL SLIDE SURFACE ON A GUIDE SLEEVE CONSISTING OF PLASTIC MATERIAL FOR A LENGTH-ADJUSTABLE CHAIR COLUMN

[75] Inventor: Hans Jürgen Bauer, Altdorf, Fed. Rep. of Germany

[73] Assignee: Suspa Compart Aktiengesellschaft, Altdorf, Fed. Rep. of Germany

[21] Appl. No.: 732,537

[22] Filed: Jul. 19, 1991

[30] Foreign Application Priority Data

Aug. 1, 1990 [DE] Fed. Rep. of Germany ....... 4024392

[51] Int. Cl.⁵ .............................................. B23D 37/00
[52] U.S. Cl. ................................................... 409/244
[58] Field of Search ................ 409/244; 29/898.03, 29/898.15

[56] References Cited

U.S. PATENT DOCUMENTS

| | | |
|---|---|---|
| 1,310,933 | 7/1919 | Suverkrop et al. .................. 409/244 |
| 2,324,083 | 7/1943 | Holmes . | |
| 4,899,969 | 2/1990 | Bauer et al. . | |
| 4,916,749 | 4/1990 | Urban et al. . | |

FOREIGN PATENT DOCUMENTS

| | | | |
|---|---|---|---|
| 778958 | 11/1980 | U.S.S.R. | ............................... 409/244 |
| 933310 | 6/1982 | U.S.S.R. | ............................... 409/244 |
| 2189557 | 10/1987 | United Kingdom . | |

OTHER PUBLICATIONS

Patent Abstracts of Japan, vol. 8, No. 76 (M-288)(1513) Apr. 9, 1984 & JP-A-58 221 018 (Toyota Jidosha Kogyo K.K.) *Zusammenfassung; Abbildungen 4*.

*Primary Examiner*—Daniel W. Howell
*Attorney, Agent, or Firm*—Browdy and Neimark

[57] ABSTRACT

A method for the production of an internal slide surface on a guide sleeve of plastic material for a length-adjustable chair column consists in that the internal surface of the guide sleeve is provided with surfaces, which are undersize in proportion to a to-be-guided housing of a gas spring. Recesses are located between the individual surfaces and are oversize in proportion to the housing of the gas spring to be guided. Partial cylinder surfaces are broached in the surfaces between the recesses by broaching and in common they represent a slide surface. These measures ensure impeccable broaching with high surface quality and dimensional precision of the slide surface. Moreover, the remaining recesses, which may have the form of grooves of arbitrary cross-section, can be used as storage chambers for a lubricant.

5 Claims, 1 Drawing Sheet

METHOD FOR THE PRODUCTION OF AN INTERNAL SLIDE SURFACE ON A GUIDE SLEEVE CONSISTING OF PLASTIC MATERIAL FOR A LENGTH-ADJUSTABLE CHAIR COLUMN

FIELD OF THE INVENTION

The invention relates to a method for the production of an internal slide surface on a guide sleeve consisting of plastic material of a length-adjustable chair column, which has a guide tube with the guide sleeve and a gas spring with an annular cylindrical housing guided in said slide surface, by chip removing processing of an internal surface of the guide sleeve, of which the distance from a common central longitudinal axis, prior to the processing, is smaller than the radius of the housing and of which the distance from the central longitudinal axis, after the processing, equals the radius of the housing or is slightly greater.

BACKGROUND OF THE INVENTION

A basic problem of producing internal slide surfaces on guide sleeves of the generic type resides in that, when injection-moulded, the internal surface of the guide sleeve is provided to be undersize in proportion to the housing of the gas spring. The slide sleeve is then reamed to get the desired dimension. Experience has shown that the precision of this method is very often insufficient, resulting in turn in insufficient guide and slide properties between the housing of the gas spring and the guide sleeve. Since the shearing forces exercised on the chair columns of chairs are comparatively high, any inaccuracies of production and too wide tolerances are detrimental to the guide and slide characteristics.

SUMMARY OF THE INVENTION

It is an object of the invention to create a method of the generic kind by means of which high dimensional precision of the internal slide surface relative to the housing of the gas spring can be achieved. It is a further object of the invention to achieve high surface quality, i.e. little surface roughness.

This object is attained in accordance with the invention by the internal surface being provided with recesses prior to the chip removing processing, of which the distance from the central longitudinal axis is greater than the distance of the slide surface from the central longitudinal axis and by the chip removing processing taking place by broaching. Extraordinarily high precision can be achieved by broaching as chip removing method in a very short processing time, because broaching requires only one single pulling operation by a broach with a plurality of blades for completely producing the desired surface. On the other hand, the structure of the internal surface to be processed serves to achieve that a chip is cut in each case only between two neighbouring recesses. Thus it is prevented that a uniform chip cut all around the circumference of the internal surface causes compressions and thus damages of the surface or internal face of the slide sleeve. The partial cylinder surfaces cut as a result of the measures according to the invention and which in their entirety form the internal slide surface are, therefore, broached with extremely high surface quality and dimensional precision.

The recesses remaining after broaching, which may have the form of grooves of different and arbitrary cross-section, can be used as lubricating chambers, whereby still an additional effect is achieved.

Further advantages, features and details of the invention will become apparent from the ensuing description of an example of embodiment taken in conjunction with the drawing.

DESCRIPTION OF THE PREFERRED EMBODIMENT

Figure 1:
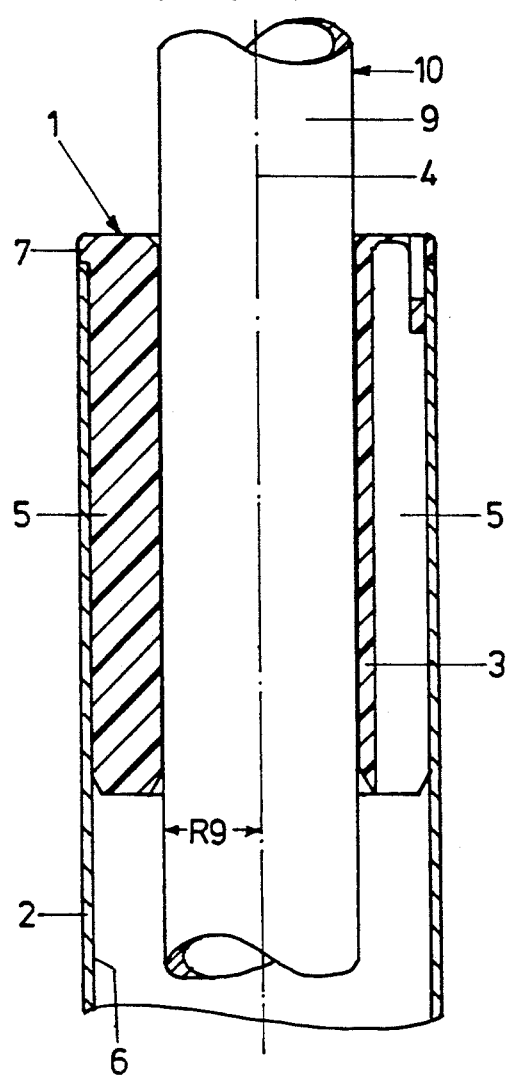
FIG. 1 is a partial section of a length-adjustable chair column with guide tube, guide sleeve and housing of a gas spring.

A guide sleeve 1 is arranged in a roughly outlined guide tube 2 of a length-adjustable chair column. Such chair columns are for instance known from U.S. Pat. No. 4,899,969.

The guide sleeve 1 has a slide sleeve 3, on the outside of which rib webs 5 are formed protruding outwards radially in relation to the central longitudinal axis 4. By means of these rib webs 5 the guide sleeve 1 radially bears against the inside wall 6 of the guide tube 2. An upper annular collar 7 arrests the guide bush 1 in axial direction in relation to the guide tube 2. The guide sleeve 1 is entered into the guide tube 2 with press fit.

A housing 9 of a roughly outlined gas spring 10 is guided to slide on the internal surface 8 of the slide sleeve 3 in the direction of the axis 4. Together with the guide tube 2 and the guide sleeve 1 this gas spring 10 substantially forms the length-adjustable chair column in question. The housing 9 of the gas spring 10 can be the latter's direct housing or it can be an additional carrying tube surrounding the gas spring 10, as it is equally known from U.S. Pat. No. 4,899,969.

Figure 2:
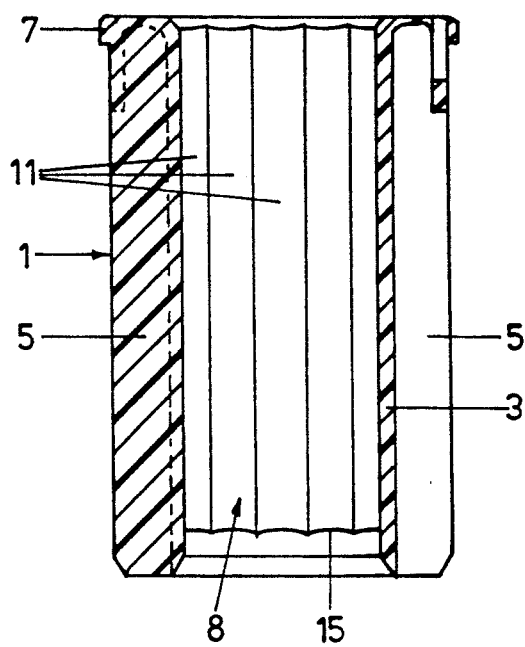
FIG. 2 is a longitudinal section of the guide sleeve prior to the processing of the internal surface.
Figure 3:
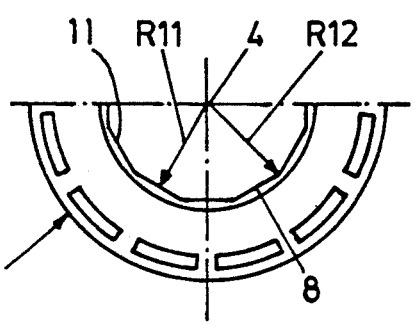
FIG. 3 is a top view of FIG. 2.

The guide sleeve 1 consists of plastic material, preferably of a polyacetal, and is manufactured in one piece by injection-moulding. After being injection-moulded, the internal surface 8 is undersize in proportion to the annular cylindrical housing 9 of the gas spring 10; this undersize is necessary in order that the slide sleeve 3 of the guide sleeve 1 can be provided with a very precisely calibrated internal surface 8 serving as guide surface for the housing 9 in a single chip removing operation. As seen in FIGS. 2 and 3, the internal surface 8 of the guide sleeve 1 is polygonal in shape prior to the mentioned processing operation, namely in the form of a regular polygon, of which the central longitudinal axis is also formed by the axis 4. It is for instance provided in the form of a regular duodecagon. It is formed by the surfaces 11, of which the edges - referred to the axis 4 - form recesses 12. Consequently, the distance R12 of each recess 12 from the axis 4 is greater than the smallest distance R11 of the surfaces 11 from the axis 4, this smallest distance R11 being in each case positioned in the middle between two edges or recesses 12. With reference to the radius R9 of the cylindrical housing R12>R9>R11 applies.

Figure 4:
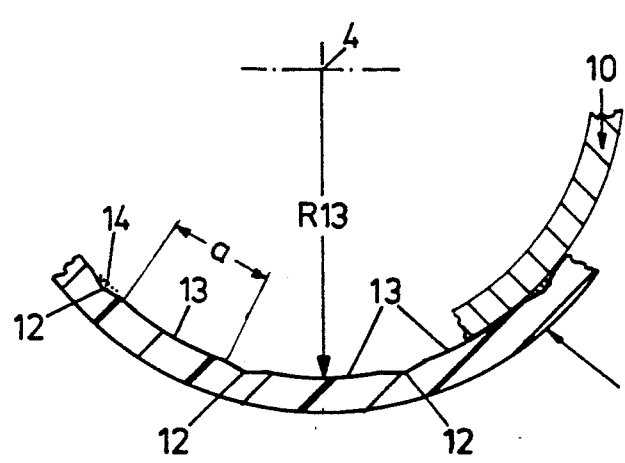
FIG. 4 is a partial cross-section through the guide sleeve after the chip removing processing.

The internal surface 8 of the slide sleeve 3 structured as described above is broached in the course of the chip removing calibration in a single broaching operation, i.e. by means of a broach, which has cutting teeth extending over the full circumference and with a circular blade. As shown on an enlarged scale in the partial representation according to FIG. 4 - partial cylinder surfaces 13 arranged symmetrically in relation to the axis 4 with a radium R13 are broached in the surfaces 11, the relation R12>R12≧R9 applying, and R13 being greater than R9 only by some hundredths of a millimeter at maximum, for example by up to 5 hundredths of a millimeter. During this broaching operation partial areas are cut off the surfaces 11, these partial areas formed by the partial cylinder surfaces 13 being separated from one another by the recess 12 located in between. The chips cut off each surface 11 therefore maximally have a width that maximally corresponds to the width a of the respective partial cylinder surface 13. The chips cut off adjacent surfaces 11 are interrupted in the area of the recess 12 located in between them. This kind of broaching of the partial cylinder surfaces 13 causes that the latter are broached to be very smooth with high surface quality, because the plastic chips resulting from the broaching can easily be discharged. There is no risk of their getting stuck between the cutting teeth of the broaching tool and the internal surface 8 of the slide sleeve 3 and damaging the latter's surface. The sum of the partial cylinder surfaces 13 forms the actual guide surface of the slide sleeve 3 vis-à-vis the housing 9 of the gas spring 10.

The remaining groove-like recesses 12 can be used as lubricating grooves, i.e. as storage rooms for a lubricant 14. This is feasible in simple manner in particular when an inwards protruding rim 15, of which the interior diameter after broaching equally amounts to R13, is formed in the lower area of the slide sleeve 3 facing away from the annular collar 7. This rim 15 seals off the recesses 12 serving as lubricating grooves or pockets at the bottom so that the lubricant 14 cannot exit downwards.

What is claimed is:

1. A method for the production of an internal slide surface on a guide sleeve (1) consisting of plastic material of a length-adjustable chair column, which has a guide tube (2) with the guide sleeve (1) and a gas spring (10) with an annular cylindrical housing (9) guided in said slide surface (13), by chip removing processing of an internal surface (8) of the guide sleeve (1), of which the distance (R11) from a common central longitudinal axis (4), prior to the processing, is smaller than the radius (R9) of the housing (9) and of which the distance (R13) from the central longitudinal axis (4), after the processing, equals the radius (R9) of the housing (9) or is slightly greater, wherein the internal surface (8) is provided with recesses (12) prior to the chip removing processing, of which the distance (R12) from the central longitudinal axis (4) is greater than the distance of the slide surface (13) from the central longitudinal axis (4) and wherein the chip removing processing takes place by broaching.

2. A method according to claim 1, wherein the internal surface (8) corresponds in cross-section to a polygon prior to the chip removing processing.

3. A method according to claim 2, wherein the internal surface (8) has the cross-section of a regular polygon symmetric to the central longitudinal axis (4) prior to the chip removing processing.

4. A method according to claim 1, wherein partial cylinder surfaces (13) are broached between the recesses (12), which partial cylinder surfaces (13) are arranged in circular symmetry relative to the central longitudinal axis (4).

5. A method according to claim 1, wherein the recesses (12) are sealed off at least at one end of the slide surface (13) to form storage chambers for a lubricant (14).

* * * * *